Figure 1:
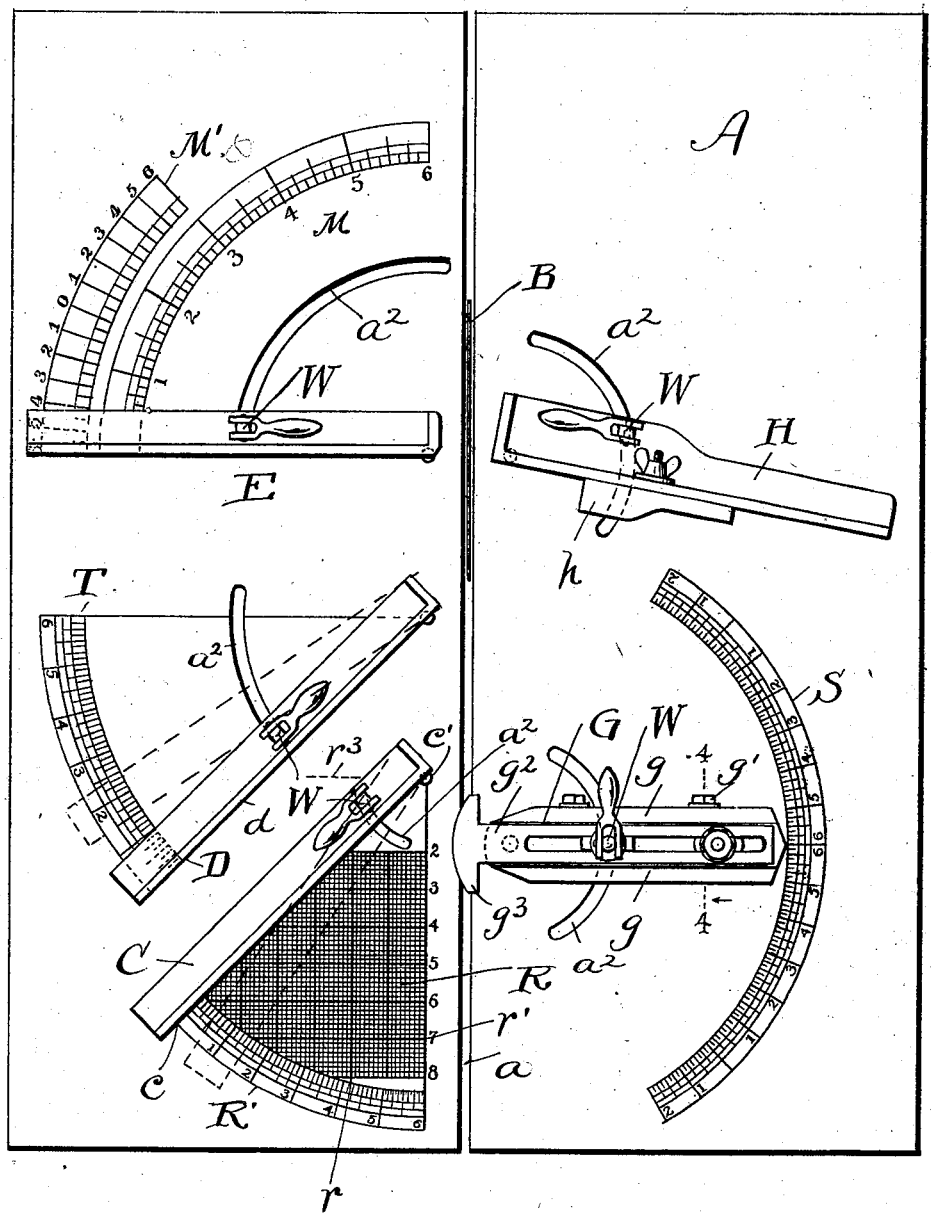

No. 702,043. Patented June 10, 1902.
J. T. ZIKA.
MITERING MACHINE.
(Application filed Nov. 23, 1901.)
(No Model.) 2 Sheets—Sheet 1.

Witnesses
E. B. Gilchrist
H. M. Wise

Inventor
Joseph T. Zika,
By his Attorneys
Thurston & Bates

No. 702,043. Patented June 10, 1902.
J. T. ZIKA.
MITERING MACHINE.
(Application filed Nov. 23, 1901.)
(No Model.) 2 Sheets—Sheet 2.

Witnesses.
E. B. Gilchrist
H. W. Wise

Inventor:
Joseph T. Zika,
By his Attorneys,
Thurston & Bates.

UNITED STATES PATENT OFFICE.

JOSEPH T. ZIKA, OF CLEVELAND, OHIO.

MITERING-MACHINE.

SPECIFICATION forming part of Letters Patent No. 702,043, dated June 10, 1902.

Application filed November 23, 1901. Serial No. 83,368. (No model.)

*To all whom it may concern:*

Be it known that I, JOSEPH T. ZIKA, a citizen of the United States, residing at Cleveland, in the county of Cuyahoga and State of Ohio, have invented a certain new and useful Improvement in Mitering-Machines, of which the following is a full, clear, and exact description, reference being had to the accompanying drawings.

The invention relates to certain improvements in a machine which includes a cutting-tool operating in a definite plane, a table relatively movable with respect to said tool, and guide-blocks adjustable in position upon said table whereby to adapt them to properly guide the work for presentation to the said tool.

One object of the invention is to provide the table with a suitable adjustable guide-block and with a system of correlated graduations by which a workman may quickly and accurately set said block in proper position for the particular job in view without first measuring or laying out the desired angle or ascertaining either by a protractor or bevel-square or any other means or tool what the desired angle is.

Another object is to provide a table having such an adjustable guide-block and graduations with other adjustable guide-blocks and correlatively-graduated scales associated severally with all of said guide-blocks, whereby when the first block has been adjusted for a particular job the other blocks may be quickly adjusted at properly-correlated angles whose actual measurements in degrees are not necessarily known to the workman.

The invention is shown in connection with a movable saw-table, although it is adapted for use in machines employing some cutting-tool other than a saw and in machines adapted to work on metal as well as wood and in machines when the table is not movable, but the tool is. The invention, however, is particularly useful in cutting and shaping the ends of the bars employed in making cut-up window-sashes and will be explained herein particularly in respect to its adaptation for such use.

The invention may be here generalized as consisting, first, in a machine employing cooperatively a cutting-tool operating in a definite plane, a work-supporting table relatively movable in a path which is parallel to the cutting-tool, an adjustable guide-block pivoted on said table, a system of graduations associated with said block and consisting of rectangular coördinates whose base-lines lie at right angles to each other and pass through the axis of the pivot of the block; second, of said construction, to which is added other pivoted guide-blocks and arc-shaped scales severally associated with all of said guide-blocks and having correlated graduations by means of which when the guide-block first referred to has been set for a given job the other guide-blocks may be set in properly-correlated positions for other cuts necessary in the same job, all of which will be hereinafter described, and pointed out definitely in the claims.

Figure 2:
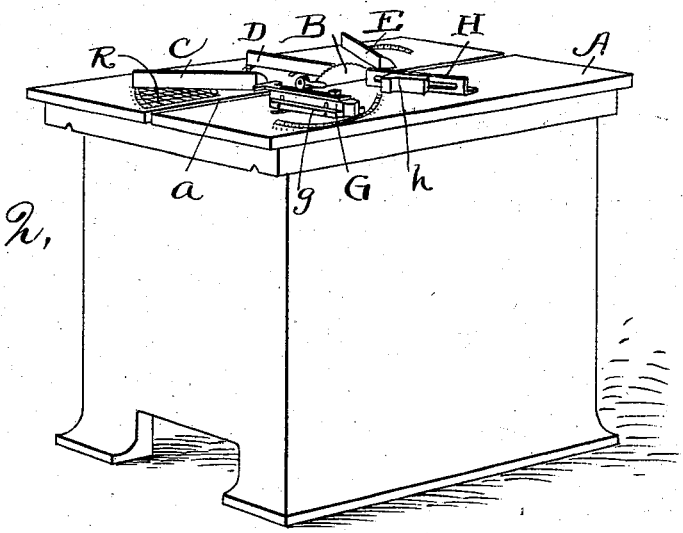
Figure 3:
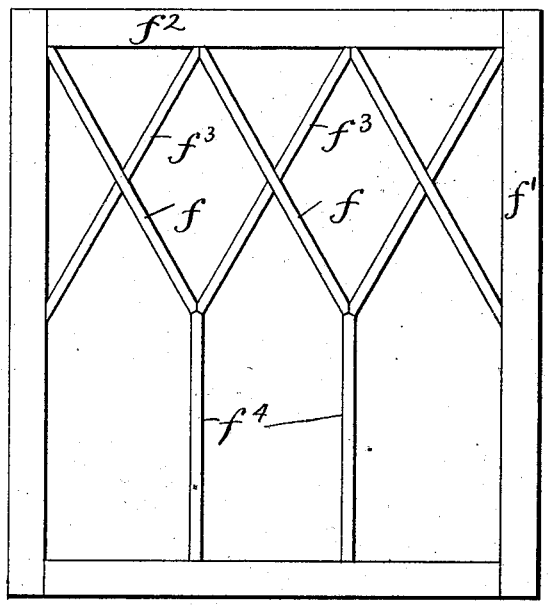
Figure 4:
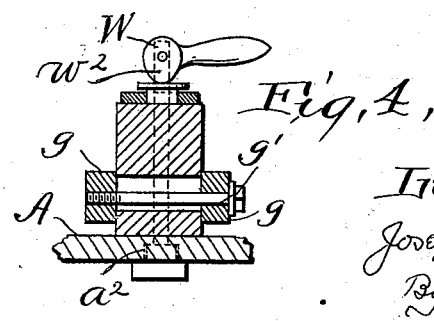

In the drawings, Figure 1 is a plan view of the table embodying the invention. Fig. 2 is a perspective view of a machine of which said table is a part. Fig. 3 is an elevation of a cut-up window-sash employing bars whose ends are cut at the necessary correlated angles to adapt them to properly fit the window-sash and one another. The purpose of this view is to show the character of the work for which this invention is primarily adapted. Fig. 4 is a vertical sectional view through the table and the guide-block end in the plane indicated by the lines 4 4.

Referring to the parts by letters, A represents the work-supporting table, and B represents the cutting-tool, which in the present instance is a circular saw working in a definite plane and projecting through the throat $a$ of the table, the table being movable in a path parallel with the plane in which the saw operates.

C represents a guide-block upon the table and pivoted thereto, which guide-block occupies a suitable position, substantially as shown, relative to the throat $a$, whereby it may serve as a guide for a piece of work extending over the throat. The guiding-face $c$ of this block is in a vertical plane which passes through the axis of the pivot $c'$ of the block. The pivot, as shown, is a cylindrical stud projecting downward from a plate whose front face is in the plane of the axis of said stud, and this plate is secured to the guide-block with its said face flush with the guide-face of said block. As shown, this block is movable between a position in which its guiding-face is approximately parallel to the plane of the saw and a position in which said face lies in a plane at an angle of forty-five degrees to the plane of the saw. This block might be movable beyond the plane last referred to, although in the machine shown, which is especially adapted for cutting the ends of window-sash bars, it is not necessary. On the table and in the field over which this bar C is movable is a scale R or system of graduations consisting of equally-spaced rectangular coördinates $r\ r'$, which are respectively parallel to and at right angles to the plane of the saw. The base-line of the series of lines, which are parallel to the plane of the saw, if prolonged would pass through the axis of the pivot $c'$ of the block. The base-line of the series of lines which are at right angles to the plane of the saw would if drawn likewise pass through the plane of the axis of the same pivot. In practice, however, it is not necessary to actually extend the graduations to the pivot or to draw the base-line last referred to. Its theoretical position is indicated by the dotted line $r^3$, which is parallel with the lines $r'$. The unit of these graduations is preferably one inch, because that is a unit which all workmen are familiar with, and these units of graduation are subdivided by other lines into eighths of an inch. Arranged in a longitudinal row, but adjacent to the transverse lines in this rectangular scale are figures indicating in units the distance of the associated lines from the transverse theoretical base-line. When the guide-block C is set at an angle of forty-five degrees to the plane of the saw, every point on its guide-face will be equally distant from the two base-lines of this scale. Outside of this rectangular scale is an arc-shaped scale R′, divided into equal spaces. Here again, preferably, the inch (and not the degree) is selected as the unit of graduation, and the unit divisions are still further subdivided into eighths. The zero of graduation is at the forty-five-degree point—that is to say, in a plane intersecting the arc-shaped scale and lying at an angle of forty-five degrees to the plane of the saw.

D represents another guide-block which rests upon the table and is pivoted thereto and is movable about its pivot, so that its guide-face $d$ may be at any suitable angle to the plane of the saw. Upon the table in the field in which this guide-block is movable is an arc-shaped scale T, graduated with the same unit which is employed for graduating the scale associated with the block C. The zero of graduation is at the forty-five-degree point, and the guide-block is movable from this forty-five-degree position to a position wherein its guide-face lies at an angle of ninety degrees to the plane of said saw. Of course this block might be capable of a greater movement than it has, as shown, and the associated scale might be correspondingly extended. It is, however, unnecessary in a machine adapted to cutting window-sash bars that this guide-block shall be movable except as shown—that is to say, from a forty-five-degree position to a ninety-degree position.

E represents a third guide-block upon the table and pivoted thereto. It is movable from a position at right angles to the plane of the saw to a position parallel thereto, or, in other words, to a position one hundred and eighty degrees removed from the position which the guide-block C will occupy when it is parallel with the plane of the saw. Associated with this guide-block E are two arc-shaped scales M M′—one of them, M, extending through an arc of ninety degrees and having its zero of graduation at the intersection with the arc-shaped scale of a plane coincident with the guide-face of the block when it is at right angles to the plane of the saw. The unit of graduation must be the same or some multiple of the same unit which is employed in the two other arc-shaped scales referred to. For reasons which will appear in describing the use of this guide-block and scale I prefer that the unit of graduation shall be twice as large as the unit employed in the arc-shaped scales already described. The other arc-shaped scale, M′, associated with the guide-block E, extends over a forty-five-degree arc, and its unit of graduation is at a point midway between the forty-five-degree point and the ninety-degree point—that is to say, twenty-two and one-half degrees from the zero of graduation of the scale M or sixty-seven and one-half degrees from the plane of the saw. The scale M is graduated in both directions from its zero. The unit of graduation must be the same or some multiple of the said unit employed on the arc-shaped scales associated with the two blocks C and D; but for reasons which will presently appear I prefer to make this unit one-half the other units referred to.

G represents a fourth guide-block, which is pivoted upon the table, but on the opposite side of the throat $a$ thereof with reference to the three guide-blocks previously described. Associated with the block G is an arc-shaped scale S, whereon are four systems of graduations. The zero of two systems is at the forty-five-degree point on one side of the ninety-degree point, and the graduations extend in opposite direction from the said zero-point. The zero-point for the other systems of graduation is at the forty-five-degree point, but on the opposite side of the ninety-degree point, and the graduations run in opposite directions from this zero. The unit of these graduations is the same as the unit employed in the scale associated with the guide-block C. This guide-block G has secured to each of its guide-faces a shelf or flange $g$, upon which the bars to be cut may be supported, and these supporting-shelves are made vertically adjustable to compensate for their wear and for the wear or set of the saw. They are held against the sides of the block G by bolts $g'$ passing through holes in said block. Upon this guide-block G is a movable gage $g^2$, which may be adjustably secured to the block in any position relative thereto, and this gage is provided with the arms $g^3$.

All of these guide-blocks are capable of being locked at any point in their several paths of movement. Any suitable means may be employed for this purpose. That shown for this purpose consists of a clamping-bolt W, passing through an arc-shaped slot $a^2$ in the table and through a hole in the guide-block, and a cam $w^2$, pivoted to the end of this bolt and adapted to bear upon the face of the guide-block.

H represents an arm which is pivoted to the table-top and is capable of swinging about its pivot and of being locked to the table in any of its possible positions. It is provided with a movable stop or gage $h$, which may be clamped to the bar itself in any desired position by means of a screw fast to the block and passing through a slot in the arm and a nut upon said screw. This bar is an adjustable gage capable of use in connection with any of the three guide-blocks at the left side of the throat of the table. To adjust these several guide-blocks to properly cut the ends of the bars for a cut-up window-sash—such, for example, as is shown in Fig. 3—it is only necessary that the workman should know the distances from the corner of the window-sash at which it is desired that a bar $f$ shall engage with the stile $f'$ and rail $f^2$, respectively. It is not necessary for him to know at what angle the bar shall lie relative to the rail or stile or the bars $f^3$, running in the opposite inclined direction. If, for example, the bar $f$ is to engage with the rail four inches from the corner and with the stile six inches from the corner, the workman finds on the rectangular scale the point of intersection of a line four units from the longitudinal base-line and six units from the base-line at right angles thereto and moves the guide-block until its guiding-face registers with the intersection of these lines, as shown, for example, by the dotted lines in Fig. 1. He then reads the indication on the associated arc-shaped scale, which will, in the case referred to, be "$1\frac{1}{2}$." He then sets the guide-block D in a position one and one-half units removed from the zero-point of the associated scale. These two guide-blocks are now set so that when a bar is held against the guide-block C its end will be cut off by the saw at the proper angle for engagement with the stile of the sash, and when said bar is held against the guide-block D its opposite end will be cut off at the proper angle for engagement with the rail of the sash. In these cut-up window-sashes one set of bars $f$ inclined in one direction are long and continuous. The bars $f^3$, which lie at the opposite inclination, are necessarily short bars, which fit between the bars first referred to, and in order that these bars shall fit their ends must be cut off at certain definite angles which differ from the angles of the stile or rail cut. The guide-block E may be set for this purpose by moving it from the position shown at the full lines in Fig. 1, where it is at the zero of graduation of the long scale M twice as far as the two guide-blocks C and D first named were moved from their initial position, or, when this scale is graduated, as shown, this block will be moved from the zero position the same number of units as the other blocks were moved on their scale. If a bar is held against the guide-face of this block, its end will be cut off by the saw at the proper angle to fit against the oppositely-inclined bar. In other words, this block will be set for the "bar-cut."

It frequently happens that two oppositely-inclined bars $f f^3$ are required to meet a third bar $f^4$, which is parallel with the stile of the sash. Experience and custom have decreed that the meeting ends of these three bars shall be so cut that said ends shall make like angles with the sides of said bars. To set the block E so that it will serve as a guide for this cut, it is necessary to set the bar in a position which is one-half as far removed from the zero of graduation in the outer scale M' as the bar C, for example, was removed from its zero of graduation. If the unit of graduations in this scale is one-half the unit of graduation of the scales associated with the bars C and D, then this bar E will be set in a position removed from the said zero of graduation just as many units as the bar C was moved from its unit of graduation. Whether the bar E shall be moved above or below its unit of graduation depends upon whether two oblique bars in meeting form an interior angle which is greater or less than a right angle. If less than a right angle, then the block E will be moved down from its zero of graduation on the outer scale. If the angle is greater, it will be moved up. The guide-block G is especially adapted for holding and guiding the ends of the window-sash bars, which are to be cut to fit that member of the window-sash which carries the check-rail, which end must not be cut entirely across. When the guide-block is set properly, a bar $f$ will be placed upon the one or the other of the shelves $g$, whereby they are held at such a suitable elevation relative to the saw that it will cut in the bar a kerf of the proper depth. These shelves are adjustable to compensate for wear of their top surfaces and for the wear of the saw. If the bar to be cut is to be inclined in one direction relative to the check-rail, it is placed on, say, the shelf $g$ on the upper side of the bar, which bar is moved to the upper zero. If said bar is to be at an angle of less than forty-five degrees to the check-rail, the block is then moved down to the graduation to which the block C was originally set. If the angle is to be greater than forty-five degrees, the block is moved a corresponding distance on the upper scale. If the bar is to incline in the other direction, it is placed on the lower shelf and the block is correspondingly adjusted on one of the lower scales. The gage $g^2$ is adjusted so that when the end of the bar to be cut rests against one of the arms $g^3$ the kerf will be cut at the proper distance from the end of the said bar.

Having described my invention, I claim—

1. The combination of a cutting-tool operating in a definite plane, with a work-supporting table relatively movable in a path parallel to said plane, a guide-block pivoted to said table and adapted to move about its pivot into various operative positions, and means for locking said guide-block in any desired position, the table, in the field over which said block is movable, being graduated with a series of rectangular coördinates of which the base-lines (theoretical or actual) pass through the axis of the block.

2. The combination of a cutting-tool operating in a definite plane, with a work-supporting table relatively movable in a path parallel to said plane, a guide-block pivoted to said table and adapted to move about its pivot into various operative positions, and means for locking said guide-block in any desired position, the table, in the field over which said block is movable, being graduated with a series of rectangular coördinates of which the base-lines (theoretical or actual) pass through the axis of the block, there being also, in the field over which said guide-block is movable, a graduated arc-shaped scale of which the zero of graduation registers with the guide-face of said block when the block lies at an angle of forty-five degrees to said plane.

3. The combination of a cutting-tool operating in a definite plane, with a work-supporting table relatively movable in a path parallel to said plane, a guide-block pivoted to said table and occupying normally a position in which its guide-face is at an angle of forty-five degrees to said plane, which block is movable from said position toward a position in which the guide-face is parallel to said plane, and means for locking said guide-block in any of its possible positions, the table, in the field over which said block is movable, being graduated with a series of equally-spaced parallel lines of which the base-line passes through the axis of the pivot of the block, and another series of intersecting lines which are parallel to and corresponding distances from a base-line (theoretical or actual) which passes through the axis of said pivot at right angles to said plane.

4. The combination of a cutting-tool operating in a definite plane, with a work-supporting table relatively movable in a path parallel to said plane, two guide-blocks pivoted to said table and independently movable into various positions relative to said plane, mechanisms for independently locking said guide-blocks in any of their several positions, there being on the table associated with one of said guide-blocks and in the field over which the block moves, a series of rectangular coördinates of which the base-lines (theoretical or actual) pass through the axis of the pivot of the block, and an arc-shaped scale of which the zero of graduation is in a plane lying at an angle of forty-five degrees from the plane of the cutting-tool and said graduations extend therefrom toward a plane parallel with said plane of the tool, there being on the table also associated with the other guide-block and in the field over which it moves, a correspondingly-graduated arc-shaped scale whose zero of graduation is in a plane which lies at an angle of forty-five degrees to the plane of the tool and extends therefrom toward a plane lying at an angle of ninety degrees from the plane of the tool.

5. The combination of a cutting-tool operating in a definite plane, with a work-supporting table relatively movable in a path parallel to said plane, three guide-blocks pivoted to said table and independently movable upon their pivots into various operative positions, independent mechanisms for locking said guide-blocks in any desired position, there being upon the table associated with one of the guide-blocks and in the field over which it moves, a system of rectangular coördinates of which the base-lines (theoretical or actual) pass through the axis of the pivot of the block, and an arc-shaped scale whose zero of graduation is in the plane lying at an angle of forty-five degrees to the plane of the tool and which extends from this plane toward a plane parallel to the plane of the tool, there being associated with one of the other blocks a correspondingly-graduated arc-shaped scale whose zero of graduation is in a plane lying at an angle of forty-five degrees to the plane of the tool and which extends therefrom toward a plane lying at ninety degrees to the plane of said tool, there being associated with the third block a correspondingly-graduated arc-shaped scale whose zero of graduation is in a plane lying at an angle of sixty-seven and one-half degrees to the plane of the tool and whose graduations extend in both directions from the zero.

6. The combination of a cutting-tool operating in a definite plane, with a work-supporting table relatively movable in a path parallel to said plane, three guide-blocks pivoted to said table and independently movable upon their pivots into various operative positions, independent mechanisms for locking said guide-blocks in any desired position, there being upon the table associated with one of the guide-blocks and in the field over which it moves a system of rectangular coördinates of which the base-line (theoretical or actual) passes through the axis of the pivot of the block, and an arc-shaped scale whose zero of graduation is in the plane lying at an angle of forty-five degrees to the plane of the tool and which extends from this plane toward a plane parallel to the plane of the tool, there being associated with one of the other blocks a correspondingly-graduated arc-shaped scale whose zero of graduation is in a plane lying at an angle of forty-five degrees to the plane of the tool and which extends therefrom toward a plane lying at ninety degrees to the plane of said tool, there being associated with the third block a correspondingly-graduated arc-shaped scale whose zero of graduation is in a plane lying at an angle of sixty-seven and one-half degrees to the plane of the tool and whose graduations extend in both directions from the said zero, there being also associated with this third block another correspondingly-graduated arc-shaped scale whose zero of graduations is in a plane lying at an angle of ninety degrees to the plane of the tool and which extends therefrom toward a plane parallel with the plane of the tool.

7. The combination of a cutting-tool operating in a definite plane, with a work-supporting table relatively movable in a path parallel to said plane, three guide-blocks pivoted to said table and independently movable upon their pivots into various operative positions, independent mechanism for locking said guide-blocks in desired positions, there being upon the table, associated with one of the guide-blocks and in the field over which it moves, a system of rectangular coördinates of which the base-lines (theoretical or actual) pass through the axis of the pivot of the block, and an arc-shaped scale whose zero of graduation is in the plane lying at an angle of forty-five degrees to the plane of the tool and which extends from this plane toward a plane parallel to the plane of the tool, there being associated with one of the other blocks a correspondingly-graduated arc-shaped scale whose zero of graduation is in a plane lying at an angle of forty-five degrees to the plane of the tool and which extends therefrom toward a plane lying at ninety degrees to the plane of said tool, there being associated with the third block a correspondingly-graduated arc-shaped scale whose zero of graduation is in a plane lying at an angle of ninety degrees to the plane of the tool and which extends therefrom toward the one-hundred-and-eighty-degree position.

8. The combination of a cutting-tool operating in a definite plane, with a work-supporting table relatively movable in a path parallel to said plane, and an adjustable guide-block pivoted thereto, there being in the field over which said block is movable four graduated arc-shaped scales, of which the zero of graduation of two of said scales is forty-five degrees removed in one direction from a plane at right angles to the plane of the tool, and the graduations on said two scales extend in opposite directions from said zero, while the zero of graduation of the other two arc-shaped scales is forty-five degrees removed in the opposite direction from a plane at right angles to the plane of the tool and the graduations thereon extend in the opposite direction from said zero.

9. The combination of a cutting-tool operating in a definite plane, with a work-supporting table relatively movable in a path parallel to said plane, an adjustable guide-block pivoted to said table, a shelf adjustably secured against the side of said guide-block, and a graduated scale on the table in the field over which said guide-block is movable.

10. The combination of a cutting-tool operating in a definite plane, with a work-supporting table relatively movable in a path parallel to said plane, an adjustable guide-block pivoted to said table, two work-supporting shelves adjustably secured to opposite vertical faces of said guide-block, and graduated scales on said table for coöperation with said guide-block.

In testimony whereof I hereunto affix my signature in the presence of two witnesses.

JOSEPH T. ZIKA.

Witnesses:
E. B. GILCHRIST,
E. L. THURSTON.